United States Patent
Nishiya et al.

(10) Patent No.: US 6,984,300 B2
(45) Date of Patent: Jan. 10, 2006

(54) METHOD FOR RECOVERING USEFUL COMPONENTS FROM ELECTROLYTIC PHOSPHATE CHEMICAL TREATMENT BATH

(75) Inventors: Shin Nishiya, Anjo (JP); Shigeki Matsuda, Okazaki (JP)

(73) Assignee: DENSO Corporation, Kariya (JP)

( * ) Notice: Subject to any disclaimer, the term of this patent is extended or adjusted under 35 U.S.C. 154(b) by 294 days.

(21) Appl. No.: 10/624,064

(22) Filed: Jul. 21, 2003

(65) Prior Publication Data

US 2004/0016649 A1    Jan. 29, 2004

(30) Foreign Application Priority Data

Jul. 22, 2002   (JP)   ............................. 2002-212982

(51) Int. Cl.
  *B01D 61/44*   (2006.01)
  *C25D 9/04*    (2006.01)
(52) U.S. Cl. .................... 205/101; 204/237; 204/528; 204/529; 204/531
(58) Field of Classification Search ................ 205/101; 204/237, 528, 529, 531

See application file for complete search history.

(56) References Cited

U.S. PATENT DOCUMENTS 5,645,706 A * 7/1997 Matsuda ...................... 205/82
2002/0162752 A1 11/2002 Matsuda et al.

FOREIGN PATENT DOCUMENTS

JP   2002-322593   11/2002

\* cited by examiner

*Primary Examiner*—Arun S. Phasge
(74) *Attorney, Agent, or Firm*—Harness, Dickey & Pierce, PLC

(57) ABSTRACT

The present invention provides means for recovering and reusing useful component ions in electrolytic phosphate chemical treatment bath without subjecting them to waste water treatment. In the present invention, a phosphate chemical treatment bath which contains phosphate ions and phosphoric acid, metal ions that form a phosphate crystal to provide a film, metal ions that are reduced from cations in the solution to form a film as metals, and ions that are involved in the reaction of the above-mentioned phosphoric acid and various metal ions to form a film, but which does not substantially contain ions that are not involved in film formation, is used as the phosphate chemical treatment bath. The aqueous solution in the washing water tank with which phosphate chemical treatment liquid adhered to the treated article after chemical treatment is contacted for dilution and washing, is subjected to electrodialysis, and useful components in said aqueous solution are thereby recovered and returned to the chemical treatment bath.

18 Claims, 4 Drawing Sheets

METHOD FOR RECOVERING USEFUL COMPONENTS FROM ELECTROLYTIC PHOSPHATE CHEMICAL TREATMENT BATH

BACKGROUND OF THE INVENTION

1. Field of the Invention

The present invention relates to surface treatment of a metal, in particular to surface treatment of a metal using a phosphate chemical treatment film and, more particularly, to a method for efficiently recovering useful components of a treatment bath (aqueous solution) that can be used to form a film.

2. Description of the Related Art

Conventionally, non-electrolytic phosphate chemical treatment has been widely used as a method for surface treatment of a metal. A non-electrolytic phosphate chemical treatment bath contains, (i) phosphate ions and phosphoric acid, (ii) metal ions that form phosphate crystals and thus provide a film (zinc, manganese, iron, etc.), (iii) metal ions that are reduced from cations in a solution and precipitate as metal to form a film (nickel, copper, etc.), (iv) ions that are involved in the reaction in which aforementioned dissolved phosphoric acid and metal ions react to form a film (nitrate ion, etc.), and (v) metal ions that are not components of the film (sodium, etc.).

Although these chemical component ions are useful for carrying out the non-electrolytic phosphate chemical treatment reaction, they also contain component which may influence the environment. Therefore, waste water containing these ions is usually discharged after being subjected to waste water treatment (ion removal treatment). Waste water treatment equipment is necessary for this removal, and cost of operating this equipment is high. In recent years, prevention of environmental pollution has been strongly called for, and the regulation of emission into environment has been expanded to include phosphorus (phosphoric acid) and nitrogen (nitrate ions), in addition to heavy metal ions (cations) of which the emission has already been strictly controlled. Emission of phosphorus and nitrogen into environment has led to eutrophication of rivers and sea areas to such an extent that the emission of these substances must also be strictly controlled. Removal of phosphorus and nitrogen from waste water requires new equipment for waste water treatment.

In the non-electrolytic phosphate chemical treatment, (i) component ions such as Na ion that are not involved in forming a film are also included to adjust the pH of the treatment bath to thereby adjust the dissociation state of phosphoric acid. In addition, (ii) a solid content such as sludge is formed in the treatment bath. (iii) Ions having low degree of dissociation such as $H_2PO_4^-$, $HNO_2$ are also included. Therefore, it has not been possible to concentrate and recover only useful component ions that are involved in forming a film from the aqueous solution in the washing water tank (in which chemical components of the treatment bath carried by the treated article are diluted) that follows the treatment bath, and to return them to the chemical treatment bath in the form of a solution for reuse. This is because cations such as Na ions, that are not components for forming a film, are also concentrated at the same time, and in order to reuse the recovered solution, these ions, such as Na ions that are not components for forming a film, must be removed from the cation, and it is substantially impossible to selectively remove Na ion and the like from the cation.

The inventor of the present invention previously filed a patent relating to electrolytic phosphate chemical treatment (Japanese Unexamined Patent Publication No. 2000-234200). The phosphate chemical treatment bath of the invention does not contain cations (metal ions), such as Na ions, that are not involved in formation of a film. Therefore, when the above-mentioned aqueous solution in the washing water tank is concentrated, concentration of Na ion or the like does not take place.

In the present invention, an electrodialysis technique (apparatus) is used as the means for concentrating the aqueous solution in the washing water tank. Electrodialysis is a method in which electric voltage and current is applied to a solution to cause ions dissolved therein to pass through a membrane for electrodialysis so as to be separated, concentrated or diluted. Thus, an electrodialysis technique is a separation method that is directed only to a solution and ions dissolved in the solution.

However, a phosphate chemical treatment bath is used for a reaction between the components to form a film. Thus, as the reaction proceeds, the component ions dissolved in the solution are converted to a solid (film, sludge) or to a gas. In order to apply the electrodialysis technique to the phosphate chemical treatment bath and aqueous solution in the washing water tank, it is desirable to provide the solution in the treatment bath in a condition free of solid or gas, and if possible, to control the dissolution state (acid dissociation state, mobility, etc.) of various ions to a constant level.

However, no method is described in the above-mentioned Japanese Unexamined Patent Publication No. 2000-234200 for reliably removing these solids and gases from the treatment bath, and therefore, no information is disclosed for applying the electrodialysis technique to a phosphate chemical treatment bath and an aqueous solution in the washing water tank.

After intensive studies, the inventor of the present invention has found a phosphate chemical treatment method that is more appropriate in practice (Patent Application Nos. 2001-49017 and 2002-20568). In these inventions, a method is disclosed in which an electrolytic phosphate chemical treatment bath can be reliably maintained in the state of a solution.

It is an object of the present invention to provide a method for setting up an environment that permits an electrodialysis technique to be used in conjunction with a phosphate chemical treatment bath, and to provide means, utilizing this technique, which permit useful component ions in the electrolytic phosphate chemical treatment bath to be recovered and to be reused in situ, and which can also prevent the emission of nitrogen, phosphorus, and fluoride, from the phosphate chemical treatment bath, into the environment.

SUMMARY OF THE INVENTION

According to a first mode of the present invention, the present invention is a method, for recovering useful components in an electrolytic phosphate chemical treatment process (equipment), wherein an electrically conductive metal article is contacted with a phosphate chemical treatment bath and the treated metal article is elecrolytically treated in aforementioned phosphate chemical treatment bath to form a film containing a phosphate compound on the surface of the treated metal article, and after the chemical treatment, the phosphate chemical treatment solution adhered to the treated metal article is diluted and washed by contacting the metal article with an aqueous solution, characterized in that:

(a) a phosphate chemical treatment bath which contains phosphate ion and phosphoric acid, metal ions that form a phosphate crystal to provide a film, metal ions that are reduced from cations in the solution to form a film as metals, and ions that are involved in the reaction of the above-mentioned phosphoric acid and various metal ions to form a film, but which does not substantially contain ions that are not involved in formation of a film, is used as a phosphate chemical treatment bath, and (b) the aqueous solution in the washing water tank with which phosphate chemical treatment liquid adhered to the treated article after chemical treatment is contacted for dilution and washing, is subjected to electrodialysis, and useful components in said aqueous solution are concentrated to or above the concentration of the chemical treatment bath, and returned to the chemical treatment tank and recovered.

The object of the present invention is attained, based on the above-mentioned invention (Japanese Patent Application Nos. 2001-49017 and 2002-20568) that permits an electrolytic phosphate chemical treatment bath to be maintained reliably in a solution phase, by recovering the useful components to a practical level using an electrodialysis technique.

In this mode of the invention, an electrically conductive metal article is first contacted with a phosphate chemical treatment bath, and the metal article to be treated is electrolytically treated in the above-mentioned phosphate chemical treatment bath to thereby form a film containing a phosphate compound on the surface of the above-mentioned metal article to be treated. Then, after the chemical treatment, the treated article having the phosphate chemical treatment solution adhered thereto is contacted with aqueous solution for dilution and washing.

In the method of the present invention, it is required to use a phosphate chemical treatment bath which contains phosphate ions and phosphoric acid, metal ions that form phosphate crystals to thereby form a film, metal ions that are reduced from cation in the solution to form a film as metals, and ions that are involved in the reaction of the above-mentioned phosphoric acid and various metal ions to form a film, but which does not substantially contain ions that are not involved in formation of a film. Metal ions that form a complex with phosphoric acid and phosphate ions in the phosphate chemical treatment bath, and form phosphate crystals in phosphate chemical treatment reaction, are preferably one or more of Zn, Fe, Mn, and Ca. The ions that are involved in the reaction in which dissolved phosphate and various metal ions react to form a film are preferably nitrate ions or fluoride ions.

As ions that are not involved in formation of a film are ions that inhibit formation of a film, it is particularly important that the treatment bath is substantially free of such components. A cation that is not involved in formation of a film means a metal ion that is not a component of a film. Thus, "the treatment bath is substantially free of such components" means that the content of metal ions other than those that are component of the film, is zero or not greater than a concentration that substantially influences the electrolyte reaction for forming a film, or the electrodialysis for recovering useful components from the washing water tank, or not greater than 0.5 g/L (of phosphate chemical treatment bath).

Then, the treated article having the phosphate chemical treatment solution adhered to it after the chemical treatment is contacted with aqueous solution in the washing water tank for dilution and washing. The aqueous solution in the washing water tank that is used for dilution and washing is subjected to electrodialysis to recover useful components in the aqueous solution.

According to a second mode of the present invention, the oxidation reduction potential (ORP) of the phosphate chemical treatment bath (indicated as the potential relative to a standard hydrogen electrode) is maintained at equal to or greater than 700 mV, and more preferably equal to or greater than 840 mV.

According to a third mode of the present invention, an aqueous solution of phosphoric acid is preferably used as the electrode solution of electrodialysis.

According to a fourth mode of the present invention, the useful ions preferably consist of phosphate ions and phosphoric acid, metal ions that form phosphate crystals to thereby form a film, metal ions that are reduced from cation in the solution to form a film as metals, and ions that are involved in the reaction in which said dissolved phosphate and various metal ions react to form a film.

According to a fifth mode of the present invention, a typical ion involved in film formation is a nitrate ion.

According to a sixth mode of the present invention, another ion involved in such film formation is a fluoride ion used in the case of application to aluminium as a treated metal article.

According to a seventh mode of the present invention, the recovered useful component is added to a phosphate chemical treatment bath and reused.

According to an eighth mode of the present invention, elecro dialysis is preferably performed by introducing, into an electrodialysis tank, the aqueous solution used for dilution and washing of the phosphate chemical treatment bath components adhered to the treated article after chemical treatment.

According to a ninth mode of the present invention, the aqueous solution in the washing water tank used for dilution and washing is diluted with water by a factor of not less than ten compared to the phosphate chemical treatment bath.

According to a tenth mode of the present invention, the electrodialysis tank has a multi-cell construction that alternately combines anion exchange membranes and cation exchange membranes.

According to an eleventh mode of the present invention, electrodialysis is preferably performed using an inter-membrane voltage, in the electrodialysis tank, not higher than the dissociation voltage of water.

According to a twelfth mode of the present invention, the electrodialysis tank is preferably further provided with electrode solution tanks for containing electrode solution, and shut-off tanks adjoining the electrode solution tank for preventing the ions subjected to electrodialysis from permeating into the electrode solution tanks.

According to a thirteenth mode of the present invention, the concentrated water having ions concentrated by electrodialysis is returned to the phosphate chemical treatment bath.

According to a fourteenth mode of the present invention, the ion concentration factor is preferably in the range of 10~1000.

According to a fifteenth mode of the present invention, the dilution water having ions, and diluted by electrodialysis, is used as the washing water in the washing water tank for dilution and washing of phosphate chemical treatment bath components adhered to the treated article after chemical treatment.

According to a sixteenth mode of the present invention, the ion dilution factor is preferably in the range of 10~1000.

DESCRIPTION OF THE PREFERRED EMBODIMENTS

In the present invention, an electrolytic phosphate chemical treatment is first performed using a phosphate chemical treatment bath which contains phosphate ion and phosphoric acid, metal ions that form a phosphate crystals to provide a film, metal ions that are reduced from cations in the solution to form a film as metals, and ions that are involved in the reaction of the above-mentioned phosphoric acid and various metal ions to form a film, but which does not substantially contain ions that are not involved in film formation. Then, the phosphate chemical treatment solution adhered to the treated article after the chemical treatment is contacted with aqueous solution for dilution and washing. The aqueous solution in the washing water tank is then subjected to electrodialysis to concentrate and recover useful components in the above-mentioned aqueous solution.

In the present invention, the prerequisites for subjecting the aqueous solution in the washing water tank that has been used for dilution and washing as described above to electrodialysis, and recovering useful components in the aqueous solution, are (1) that the concentrated solution can be reused as the electrolytic phosphate chemical treatment solution, and (2) that the solution can be brought to a state that permits electrodialysis to be carried out.

Regarding (1) in order to be able to reuse the concentrated solution as the phosphate chemical treatment solution, it is required:

(i) that the solution is substantially free of ions other than those components that are film components or are involved in film formation; and (ii) that the phosphate chemical treatment bath is not influenced by the electrode solution (electrolytic solution); and in order for this condition to be satisfied, the electrode solution needs to be suitably selected, for example, from component ions constituting the phosphate chemical treatment bath.

Regarding (2) in order to bring the solution to a state that permits electrodialysis to be carried out, it is required:

(iii) that the aqueous solution contains substantially only ions as solutes, and is free of gas or solids;

(iv) that the dissociation state of various ions in the aqueous solution is similar. If dissociation state of various ions is different, differences in rate of dialysis are produced, leading to a large difference in the rate of separation and concentration. This means that the solution recovered by electrodialysis may have a composition that deviates from the original composition. Therefore, it is necessary that the dissociation state of various ions in the aqueous solution is similar; and (v) that phase transition (solidification, gasification) does not take place when the aqueous solution is concentrated.

Requirements (i) to (v) as described above will be explained in further detail in the following.

(i) The requirement that the solution is substantially free of ions other than those components that are film components or are involved in film formation, can be satisfied by using a phosphate chemical treatment bath which contains phosphate ions and phosphoric acid, metal ions that form a phosphate crystal to thereby form a film, metal ions that are reduced from cations in the solution to form a film as metals, and ions that are involved in the reaction of the above-mentioned phosphoric acid and various metal ions to form a film, but which does not substantially contain ions that are not involved in film formation.

The above-mentioned ions that are involved in the reaction of the above-mentioned phosphoric acid and various metal ions to form a film usually refers to nitrate ions. In the case in which the treated metal is aluminium, fluoride ions may be mentioned in addition to the nitrate ions usually used. The fluoride ions are involved in the film formation reaction in that it is required to keep the surface of the aluminium article in an unoxidized state during the electrolytic chemical treatment reaction. As the ions are not incorporated as a film component, it is possible to recover 100% of the ions so that it needs not be replenished once it has been supplied at a predetermined concentration at the initial construction stage of the treatment bath. If 95% of the ions can be recovered, the amount of replenishment as a chemical has only to be 5% of the conventionally required amount, leading to reduction of replenished amount to $\frac{1}{20}$. As fluoride ions are an environmental contaminant, it cannot be emitted to the outside of a factory, and therefore, it is required to be removed in post-processing. Thus, reduction of emission of the ions is useful as a countermeasure to environmental contamination.

(ii) The requirement that the phosphate chemical treatment bath is not influenced by the electrode solution (electrolytic solution) can be satisfied most advantageously by using phosphoric acid solution that is the main component of the phosphate chemical treatment bath as the electrode solution.

(iii) The requirement that the aqueous solution contains substantially only ions as solutes, and is free of gases or solids, can be satisfied by providing the treatment bath in which reaction takes place such that substantially no gas or solid (sludge) is contained. If sludge is produced in the treatment bath, components in the treatment bath are consumed in reactions other than the film formation reaction. Therefore, it is not possible to control the composition of chemical component ions in the treatment bath in accordance with the progress of the phosphate film formation reaction.

The first means for preventing sludge from being produced in the treatment bath is to control the dissociation state of phosphoric acid by controlling the pH. More specifically, the pH of the electrolytic treatment bath is controlled so as to be not higher than pH 2.5, more preferably not higher than pH 2.

The second means for preventing sludge from being produced in the treatment bath is to control the amount of Fe ions dissolved in the treatment bath. Fe ions are dissolved into the treatment bath when iron or steel material is used as a treated article or when a Fe electrode is used as film forming metal electrode in an electrolytic treatment. Dissolution of Fe proceeds as Fe →$Fe^{2+}$→$Fe^{3+}$ and Fe ions are dissolved and present in treatment bath as $Fe^{2+}$ and $Fe^{3+}$.

Formation of sludge that accompanies the decrease of solubility of Fe ions, as the reaction $Fe^{2+}$→$Fe^{3+}$+e (770 mV) proceeds, will be explained below. This equation means that, at an ORP (oxidation-reduction potential, hydrogen standard electrode potential) of 770 mV or lower, Fe ion exists in the state of $Fe^{2+}$, while, at an ORP of 770 mV or higher, Fe ion exists in the state of $Fe^{3+}$. $Fe^{2+}$ has higher solubility as compared to $Fe^{3+}$. Thus, if, in a solution with an ORP of the treatment bath of 770 mV or lower, the ORP is raised to 770 mV or higher for some reason, when Fe ions in the solution proceed in the manner of $Fe^{2+}$→$Fe^{3+}$, they are unable to exist in the dissolved state and the oxidized $Fe^{3+}$ solidifies. Namely, sludge forms in the phosphate chemical treatment bath.

In electrolytic chemical treatment, a voltage of about 10 V or less is typically applied between the electrodes of the treatment bath. Namely, when anodic electrolysis is carried out using a steel material for the anode and cathodic electrolysis is carried out using an Fe electrode for the anode and an article to be treated for the cathode, Fe dissolves in the treatment bath (Fe→$Fe^{2+}$+2e). In addition, when an article to be treated, in the form of a steel material, is immersed in a treatment bath at pH 2.5 or lower without applying a voltage, Fe ions are dissolved. When a voltage of 1~10 V is applied between the electrodes in the treatment bath, the dissolved Fe ions are further oxidized. Namely, a state exists in the electrolytic treatment bath in which Fe ions easily proceed in the manner of $Fe^{2+}$→$Fe^{3+}$. At this time, if the ORP (oxidation-reduction potential) of the treatment bath is lower than 770 mV, oxidized Fe ions ($Fe^{3+}$) produced in the treatment bath in the manner of $Fe^{2+}$→$Fe^{3+}$ cannot be dissolved and solidify. Namely, a sludge forms in the treatment bath. However, if the ORP of the treatment bath is 770 mV or higher, as the amount of $Fe^{3+}$ dissolved in the solution is small, sludge formation by the application of a voltage/current can be prevented. It may be possible, depending upon the condition of application of a voltage/current, to eliminate the formation of sludge completely.

Therefore, maintaining the ORP (oxidation reduction potential) of the treatment bath at 770 mV or higher is preferable for preventing the formation of sludge and for preventing a reaction in the solution phase.

Next, means employed in the present invention for separating $NO_2$, $N_2O_4$ and/or NO, the gas generated in the treatment bath as electrolytic treatment proceeds, will be explained. Advantageously, by separating the phosphate chemical treatment tank into an electrolytic treatment tank that performs electrolytic treatment and an auxiliary tank that does not perform electrolytic treatment, and circulating the treatment bath between the two tanks, and providing a mechanism for exposing the treatment liquid to the atmosphere between the two tanks, or in the two tanks, NO, $NO_2$ and/or $N_2O_4$, that is, the gas generated and dissolved in the electrolytic treatment tank, can be removed from the bath. In the above-mentioned auxiliary tank that does not perform electrolytic treatment, a mechanism for causing the treatment liquid to pass through a net-like solid structure may be provided, or a filtration system having a mechanism for filtering the treatment bath may be advantageously employed. Further, a liquid circuit may be advantageously provided in which a portion of the treatment liquid is extracted at a position prior to being led to a filter member in the filtration system, and is exposed to atmosphere to remove the nitrogen oxides that exists in the treatment liquid, and then is returned to the electrolytic treatment tank.

In this mode, the filtration and circulation path of the treatment bath are basically open. Namely, in the circulation system in which treatment bath being subjected to electrolytic treatment in the electrolytic treatment tank is returned via a circulation pump and the filtration system to the electrolytic treatment tank, a mechanism is provided for removing the nitrogen oxides that are generated in the treatment bath accompanying the electrolytic treatment. This mechanism is basically a system that opens the filtration and circulation system of the treatment bath to the atmosphere.

In a system in which the filtration and circulation systems are closed, the treatment bath is in a pressurized state within the system. In the pressurized state, it is difficult for the gases dissolved in the treatment bath to escape from the solution. If a mechanism is employed that opens the filtration and circulation systems to the atmosphere, namely if a mechanism is employed that reduces pressure, the dissolved gases can easily escape from the solution.

In particular, as a mechanism that facilitates the escape of gases, a mechanism is provided that extracts a portion of the treatment liquid prior to being led to a filter member and expose it to to the atmosphere. The treatment bath is maximally pressurized in front of the filter member in the filtration system. Under these maximally pressurized conditions, gases dissolved in the treatment bath are pushed out of the solution and aggregated on the filter cloth. If a portion of the solution under these aggregated conditions is extracted and exposed to the atmosphere, the aggregated gases are rapidly released into the atmosphere.

Further, in this mode, together with the function of removing the sludge, the filter also has the function of capturing nitrogen oxide gas (NOx) dissolved in the solution. This function consists of holding the dissolved gas (NOx) on a filter cloth by allowing the solution to pass through the filter cloth. This action is caused by allowing the filter cloth to act catalytically on removal of gases.

In this manner, by improving the filtration and circulation systems, the elementary reactions of electrolytic phosphate chemical treatment differ. The reactions in which $NO_3^-$ is reduced at the electrode interface are as shown in (1) and (2).

$$NO_3^- + 4H^+ + 3e \rightarrow NO + 2H_2O : 960 \text{ mV} \qquad (1)$$

$$NO_3^- + 2H^+ + e \rightarrow 1/2 N_2O_4 + H_2O : 800 \text{ mV} \qquad (2)$$

Both of these reactions cause the generation of gas from solution (liquid). In addition, when seen from the viewpoint of decomposition of $NO_3^-$, $N_2O_4$ (g) represents the intermediate process of that decomposition, while NO (g) represents the final decomposition form. Namely, decomposition of $NO_3^-$ proceeds in the manner of $NO_3^- \rightarrow N_2O_4$ (g)→NO (g).

This reduction reaction of $NO_3^-$ results in an increase in volume due to this reaction (from a liquid to a gas).

According to Le Chatelier's principle, which is one of the basic principles of chemical reactions, in such a reaction system in which a gas is generated and pressure increases, if the reaction system is set in a direction that causes the pressure of the reaction system to decrease, the reaction proceeds in the direction of increasing pressure (that is, in the direction of increased generation of the gas).

Thus, if the reaction system is set in a direction that causes the pressure of the reaction system to decrease, decomposition of $NO_3^-$ easily proceeds in the direction of $NO_3^- \rightarrow N_2O_4$ (g)→NO (g). Conversely, if the pressure of the reaction system does not decrease, this indicates that there is the possibility of the decomposition of $NO_3^-$ stopping at $NO_3^- \rightarrow N_2O_4$ (g).

Namely, in the case in which the filtration and circulation paths of the treatment bath are basically closed systems, decomposition of $NO_3^-$ has the possibility of stopping at an intermediate point. Indicating this situation in terms of a chemical reaction formula results in formula (2) for the decomposition of $NO_3^-$. This reaction of formula (2) is possible if the ORP of the treatment bath is 800 mV or lower, and consequently, the ORP of the treatment bath is required to be 800 mV or lower.

In contrast, in the case in which the filtration and circulation paths of the treatment bath are basically open systems, decomposition reaction of $NO_3^-$ follows formula (1). If the ORP of the treatment bath is 960 mV or lower, the reaction proceeds according to formula (1). Thus, according to the principle of electrochemical reactions, in the case the ORP of the treatment bath exceeds 800 mV, decomposition reaction of $NO_3^-$ only proceeds according to formula (1) and, by providing a mechanism for venting gas from the lines, that can be easily achieved. As has been described above, a preferable mode of the present invention can be achieved by making the filtration and circulation system of the treatment bath an open system.

In a preferable mode of the present invention, there is provided a mechanism that removes NOx gas generated in the treatment bath accompanying electrolytic treatment in a circulation system in which the treatment bath subjected to electrolytic treatment in an electrolytic treatment tank is returned to said electrolytic treatment tank via a circulation pump and filter. The mechanism that removes NOx gas preferably extracts a portion of the treatment liquid prior to being led into the filter member, exposes it to the atmosphere and removes NOx gas followed by returning it to said treatment tank by a liquid circulation path. In this case, the ORP of said treatment bath is preferably made to be 800 mV or higher, and more preferably 840 mV or higher, and gas formed as a result of decomposition of $NO_3^-$ in the treatment bath is advantageously only in the form of NO (g).

Here, the need for maintaining the ORP of the treatment bath at 840 mV or higher originates in formula (3).

$$NO_3^- + 2H^{3O} + 2e \rightarrow NO_2^- + H_2O \quad (840 \text{ mV}) \qquad (3)$$

The reaction of formula (3) is a reaction that is not accompanied by a phase transition within the solution phase. The reaction of formula (3) means that, if the ORP of the treatment bath is 840 mV or lower, there is the possibility of $NO_3^-$ in the solution changing to $NO_2^-$. Such a change in the treatment bath is harmful with respect to the stability of the treatment bath. For this reason, maintaining the ORP of the treatment bath above 840 mV is advantageous in preventing the reaction of formula (3).

(iv) The dissociation state of various ions in the aqueous solution is required to be similar, because, in the electrodialysis equipment, mobility of various ions needs to be maintained in the same condition as the composition of original chemical treatment bath composition after they pass through the electrodialysis membrane and are separated at a voltage not higher than the dissociation voltage of water (solvent).

Component ions of the phosphate chemical treatment bath consists of (i) phosphate ions and phosphoric acid, (ii) metal ions that form phosphate crystal to thereby form a film (Zn, Mn, Fe, etc.), (iii) metal ions that are reduced from cations in the solution to form a film as metals (for example, Ni, Cu, etc.), and (iv) ions that are involved in the reaction in which above-mentioned dissolved phosphate ions and various metal ions react to form a film (for example, nitrate ions).

The efficiency of electrodialysis depends upon the moving speed of ions when a voltage not higher than the dissociation voltage of water is applied to the solution. Thus, when various ions are mixedly present in the solution, the mobilities of all the ions are preferably as similar to each other as possible. In a phosphate chemical treatment bath, the mobilities of above-described four types of ions are preferably as similar to each other as possible.

Figure 3:
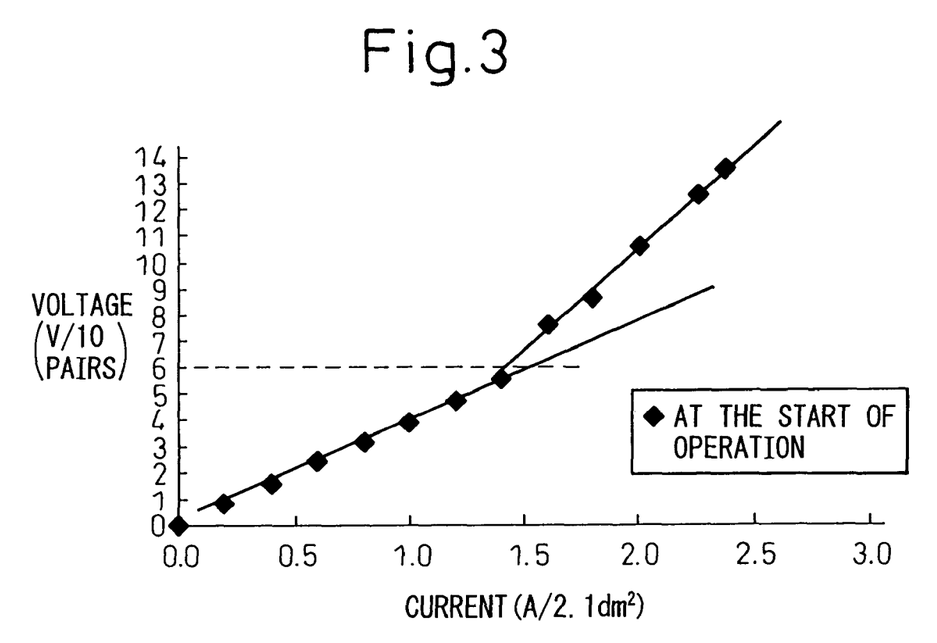
FIG. 3 is a graph showing the relation between voltage and current in the electrodialysis layer.

The dissociation voltage of water will be described below with reference to an example of the present invention. The result shown in FIG. 3 shows the relation between current and voltage when voltage/current is applied to the electrodialysis tank in the example. The result shown in FIG. 3 indicates that the current flows differently for applied voltage of up to 6 V and for 6 V and higher. It indicates that the voltage rises more sharply for a voltage of 6 V and higher. This indicates that electrodialysis proceeds differently for voltage above 6 V than for voltage below 6 V. More specifically, it is surmised that, at a voltage below 6 V, only solute ions are moved, while, at a voltage above 6 V, the motion of ions is accompanied by dissociation of solvent (water). Dissociation of solvent is undesirable since it would have an influence upon the electrochemical condition of solute components (more specifically, such condition is related to formation of sludge).

In order to be able to recover and reuse the solute components, it is necessary that the solute components do not change. Therefore, it is desirable that electrodialysis is performed at a voltage that does not give rise to dissociation of the solvent. In the above example, it is appropriate that electrodialysis is performed at a voltage of 6 V or lower.

The voltage that does not give rise to dissociation of the solvent (water) can be obtained, as described above, by sequentially raising voltage /current applied to the electrodialysis equipment and determining the voltage at which the voltage /current relation changes. The voltage that does not give rise to dissociation of the solvent (water) for the equipment as a whole depends upon the number of unit electrolytic cells. The voltage per unit electrolytic cell cannot exceed 1.23 V that is the theoretical electrolysis voltage of water. As the example of FIG. 3 is composed of 10 electrolytic tanks (cells) in all. Therefore, the voltage of 5.5 V in the example corresponds to 0.55 V per unit electrolytic cell. The voltage of 0.55 V is smaller than 1.23 V, and therefore is not accompanied by electrolysis of water.

Ion mobility varies depending upon the dissociation state of the ions. Ions with larger degree of dissociation usually exhibit good ion mobility and are moved easily upon application of voltage, while ions with smaller degree of dissociation have larger possibility of being present in the solution in non-ionic, molecule-like state so that they are not moved much upon application of voltage. Therefore, it is desirable, as a state of a solution, that various ions have similar degree of dissociation. Among ions in the above-mentioned phosphate chemical treatment bath, dissociation state of phosphoric acid should be noted. Phosphoric acid exhibits notable change of ionic dissociation state. The dissociation state of phosphoric acid varies as $H_3PO_4 \rightarrow H_2PO_4^- \rightarrow HPO_4^{2-} \rightarrow PO_4^{3-}$. Dissociation states in respective states of phosphoric acid can be indicated by pKa (acid dissociation exponent; a logarithm of the inverse of disso ciation constant). Calculation of dissociation exponent of $H_3PO_4$ is shown below.

Figure 5:
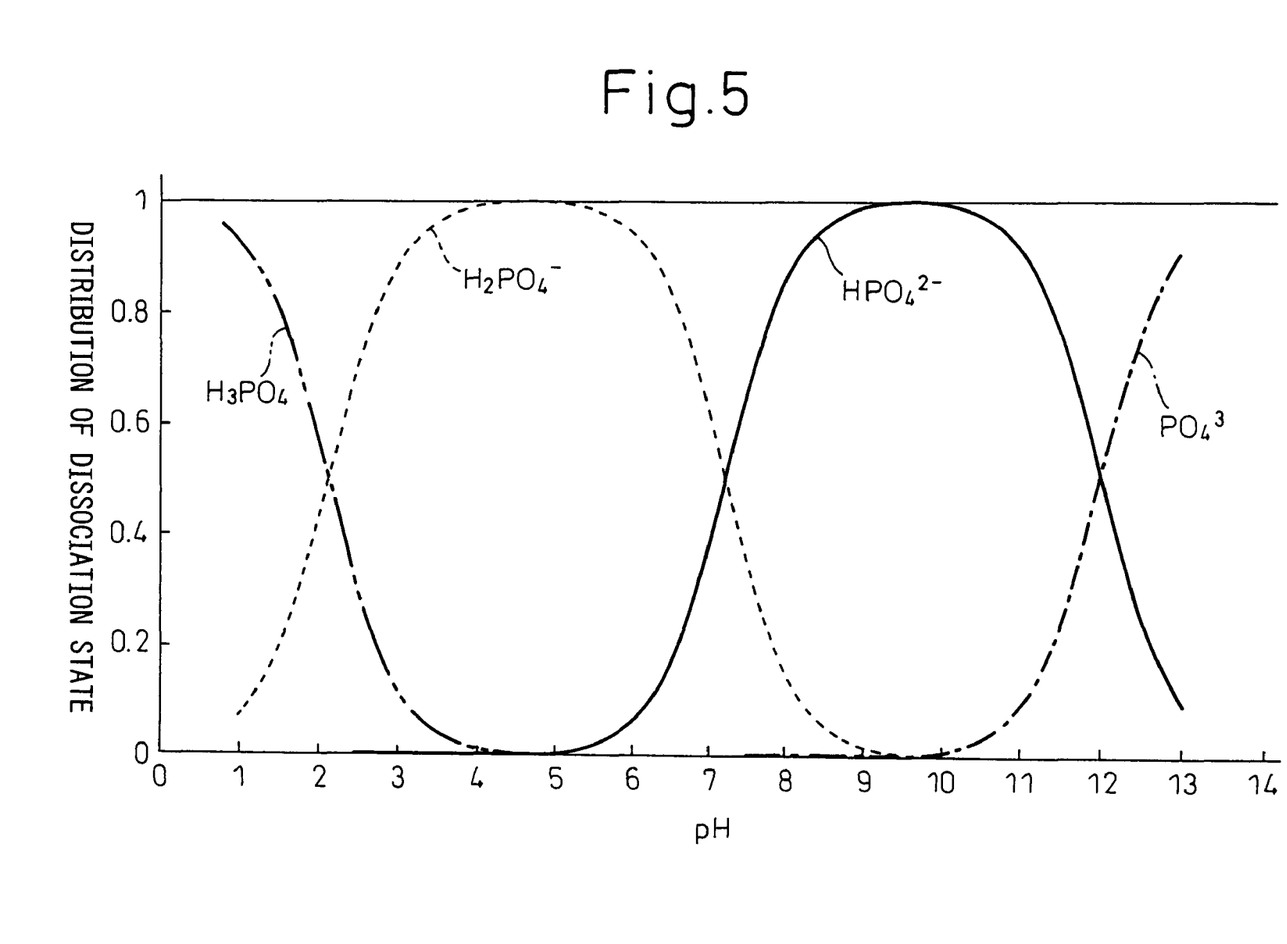
FIG. 5 is a view showing the relation between dissociation state of $H_3PO_4$ and pH of the solution.

Dissociation constant (Ka: $H_3PO_4)=[H_2PO_4^-][H^+]/[H_3PO_4]$
- $H_3PO_4=2.15$
- $H_2PO_4^-=7.2$
- $HPO_4^{2-}=12.35$ Dissociation state of $H_3PO_4$ also varies in dependence on pH (hydrogen ion concentration) of the solution. This is shown in detail in FIG. 5. Thus, it can be seen that, in order to obtain large degree of dissociation of phosphoric acid in aqueous solution, it is advantageous that phosphoric acid is maintained in the state of $H_3PO_4$ as far as possible. For this purpose, the pH of the treatment bath is preferably maintained at about 2.5 or lower, and more preferably at 2 or lower. Further, similar consideration can be given to nitrate ion ($NO_3^-$), another anion in the solution. Acid dissociation state of nitrate ion proceeds as $NO_3^-(HNO_3) \rightarrow NO_2^- (HNO_2) \rightarrow NO$. Its acid dissociation exponents are:
- $NO_3^-(HNO_3)=-1.8$
- $NO_2^-(HNO_2)=3.15$ $HNO_3$ has too large a degree of dissociation to be used in reaction system constituting the phosphate chemical treatment bath. Therefore, it is inappropriate that nitrate ion is replenished in the form of $HNO_3$ to the phosphate chemical treatment bath. Thus, nitrate ion ($NO_3^-$) is replenished to the phosphate chemical treatment bath of the present invention preferably only in the form of zinc salt ($Zn(NO_3)_2$) or nickel salt ($Ni(NO_3)_2$) to control acid dissociation state of the treatment bath (such that the dissociation may not become too large).

Further, as regards $HNO_2$, a measure should be taken such that it does not remain in the treatment bath, and this is achieved by maintaining the ORP of the treatment bath preferably at 770 mV or higher, and more preferably at 840 mV or higher (see formula (3)).

As has been described above, in order to obtain similar dissociation states for various ions in the aqueous solution, it is important to control the pH and the ORP of the treatment bath. Preferably, pH is controlled to be 2.5 or lower and ORP is controlled to be 770 mV or higher in order for an equilibrium reaction, between ions, to not be formed in the solution.

(v) It is confirmed that, in the present invention, no sludge or gas is formed when the above-mentioned aqueous solution is subjected to electrodialysis and is concentrated to a predetermined concentration of chemical treatment bath.

Further, in accordance with the present invention, electrodialysis is preferably performed, after chemical treatment, by contacting the phosphate chemical treatment liquid adhered to the treated article with an aqueous solution, and introducing the aqueous solution in the washing water tank used for dilution and washing into the electrodialysis tank. The aqueous solution in the washing water tank used for dilution and washing is usually diluted with water from the phosphate chemical treatment bath by a factor of not less than ten.

The electrodialysis tank usually has the multi-cell structure in which anion exchange membranes and cation exchange membranes are alternately combined. Selection of the ion exchange membrane may be done by a method known in the art. For example, membranes having sulfonate, carboxylate, or phosphonate group may be used as the cation exchange membrane for selectively permitting cations to pass through, and membranes having various amine or quaternary ammonium group may be used as the anion exchange membrane for selectively permitting anions to pass through. In general, membranes having strongly acidic sulfonate group and strongly basic quaternary ammonium group are used. As regards membrane structure, both homogeneous membranes and inhomogeneous membrane can be used. A cross-linking homogeneous membrane consisting of styrene-divinyl benzene copolymer can be advantageously used, and can be fabricated by impregnating a reinforcing cloth with these monomers, and after polymerization, subjecting it to sulfonation or amination reaction to obtain a desired ion exchange membrane.

Electrodialysis is preferably performed with the transmembrane voltage in the electrodialysis tank not higher than the dissociation voltage of the solvent (water).

Advantageously, the electrodialysis tank is provided with electrode solution tanks for containing the electrode solution and shut-off tanks adjoining the electrode solution tanks for preventing ions subjected to electrodialysis from permeating into the electrode solution tanks.

The concentrated water having ions concentrated by electrodialysis is returned to the phosphate chemical treatment bath.

In this case, the ion concentration factor is preferably in the range of 10~1000.

The diluted water having ions diluted by electrodialysis is used for washing of the phosphate chemical treatment bath after chemical treatment. In this case, ion dilution factor is preferably in the range of 10~1000.

EXAMPLES

Example 1

Figure 1:
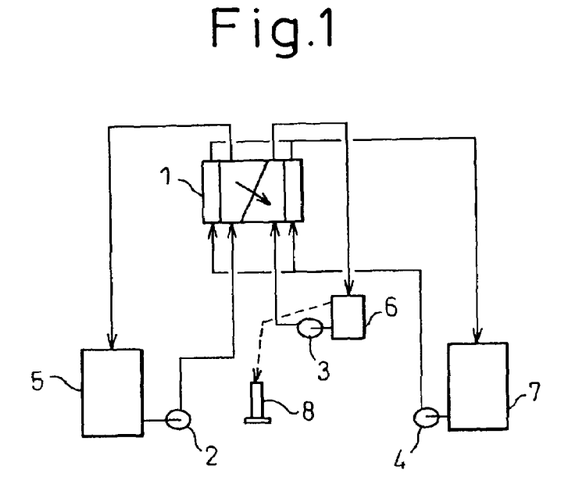
FIG. 1 is a view showing electrodialysis equipment used in an embodiment of the present invention.
Figure 2:
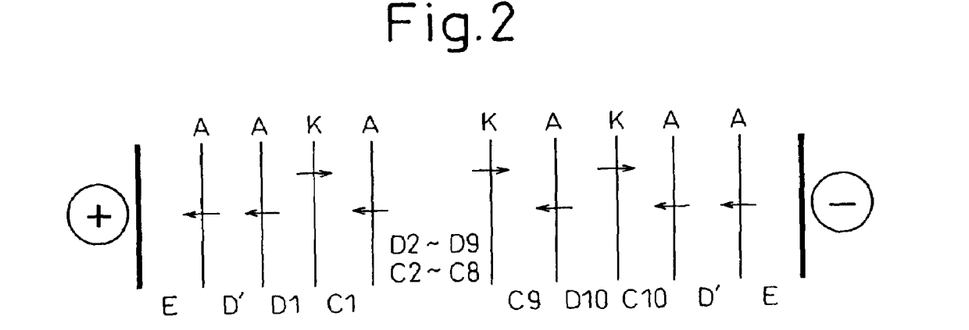
FIG. 2 is a schematic view showing an example of the structure of electrodialysis layers in the electrodialysis equipment of FIG. 1.

A phosphate chemical treatment liquid as shown in Table 1 was diluted by a factor of 20, and the diluted solution was introduced into the electrodialysis apparatus of FIG. 1 to perform electrodialysis. FIG. 2 shows the structure of the electrodialysis layer 1 in the electrodialysis apparatus of FIG. 1 (CH—O type manufactured by Asahi Glass Co., effective membrane area 0.21 $m^2$, cation exchange membrane: [Selemion] CMT, anion exchange membrane: [Selemion] AMT).

TABLE 1

|  | Volume L | Conductivity μS/cm | pH — | Nitrate ion mg/L | Phosphate ion mg/L | Zn mg/L | Ni mg/L |
| --- | --- | --- | --- | --- | --- | --- | --- |
| Phosphate chemical treatment raw liquid | 1.75 | 79000 | 1.59 | 74580 | 12800 | 16140 | 21180 |
| Liquid diluted 20 times | 35 | 6770 | 2.72 | 3740 | 640 | 824 | 1053 |

TABLE 1-continued

|  | Volume L | Conductivity μS/cm | pH | Nitrate ion mg/L | Phosphate ion mg/L | Zn mg/L | Ni mg/L |
|---|---|---|---|---|---|---|---|
| Desalted liquid | 35 | 800 | 3.00 | 170 | 370 | 42 | 54 |
| Concentrated liquid (Extracted liquid) | 0.017 L/h | 84000 | 1.84 | 84290 | 11500 | 18960 | 24790 |

Thus, a solution diluted 20 times from the phosphate chemical treatment liquid is introduced into the desalted liquid tank 5 and concentrated liquid tank 6 of the electrodialysis apparatus of FIG. 1. A phosphoric acid solution of 4 g/L is introduced into the electrode solution tank 7. Solutions in respective tanks are circulated through the electrodialysis layer using a desalted liquid circulation pump 2, a concentrated liquid circulation pump 3 and an electrode solution circulation pump 4 (8: concentrated liquid extraction tank). The circulating paths are as follows.

Liquid from the desalted liquid circulation pump 2 is introduced to the electrodialysis layers D1~D10 of FIG. 2, and is circulated. In D1~D10, anions pass through A (anion exchange membrane), while cations pass through K (cation exchange membrane) so that the solution that passes through D1~D10 is deionized.

Liquid from the concentrated liquid circulation pump 3 is introduced to the electrodialysis layers C1~C10, and is circulated. In C1~C10, anions pass through A (anion exchange membrane), while cations pass through K (cation exchange membrane) so that the solution that passes through C1~C10 has ions concentrated.

Liquid (phosphoric acid solution of 4 g/L) from the electrode solution circulation pump 4 is fed to the tank E (electrode solution tank) and is circulated. Tank D' (shut-off tank) serves to prevent ions, to be subjected to electrodialysis, from permeating into the tank E.

The electrodialysis apparatus shown in FIG. 2 uses 10 pairs of units, with unit electrodialysis membranes of 2.1 dm²/sheet. Each pump was operated at flow rate of 250 L/h. In this Example 1, DC voltage/current was applied with inter-membrane voltage of 5.5 V/10 PAIRS OF electrolytic cells to the electrodialysis apparatus. FIG. 3 shows the relation between voltage and current when a DC voltage/current is applied to the above-described electrodialysis apparatus. FIG. 3 indicates that the current flows differently for voltage above about 6 V than for voltage below 6 V. The voltage rises more sharply at 6 V and higher, indicating a decreased tendency for current to flow. This indicates that electrodialysis proceeds differently for voltage above 6 V and below 6 V. More specifically, it is surmised that, for voltage of 6 V or lower, only solute ions are moved, whereas, for voltage above 6 V, it is acompanied by dissociation of water as the solvent. Dissociation of the solvent is thought to have an influence upon the state of the solute ions. More specifically, an undesirable reaction of a solute is thought to take place, leading to formation of sludge. As, in order to be able to recover and reuse solute components, solute components must remain unchanged, the transmembrane voltage was set to 6 V or lower in Example 1.

The state of desalted liquid and concentrated liquid as shown in Table 1 represents the result of about 20 hours of electrodialysis performed with applied voltage between the electrodialysis membrane of the whole apparatus set at 5.5 V. It is shown that, as compared to the initial state at which electrodialysis was started, desalted liquid has been diluted to about 1/20 and concentrated liquid has been concentrated by a factor of 20 and has reached the concentration of the chemical treatment bath. However, dilution of phosphoric acid in the desalted liquid is small compared to other ions. This is thought to be due to solution of phosphoric acid being used as the electrode solution.

These results demonstrate that, by using electrodialysis, it is possible to stop water supply and water discharge to and from the washing water tank immediately after the phosphate chemical treatment tank, and to recover useful components.

Example 2

Figure 4:
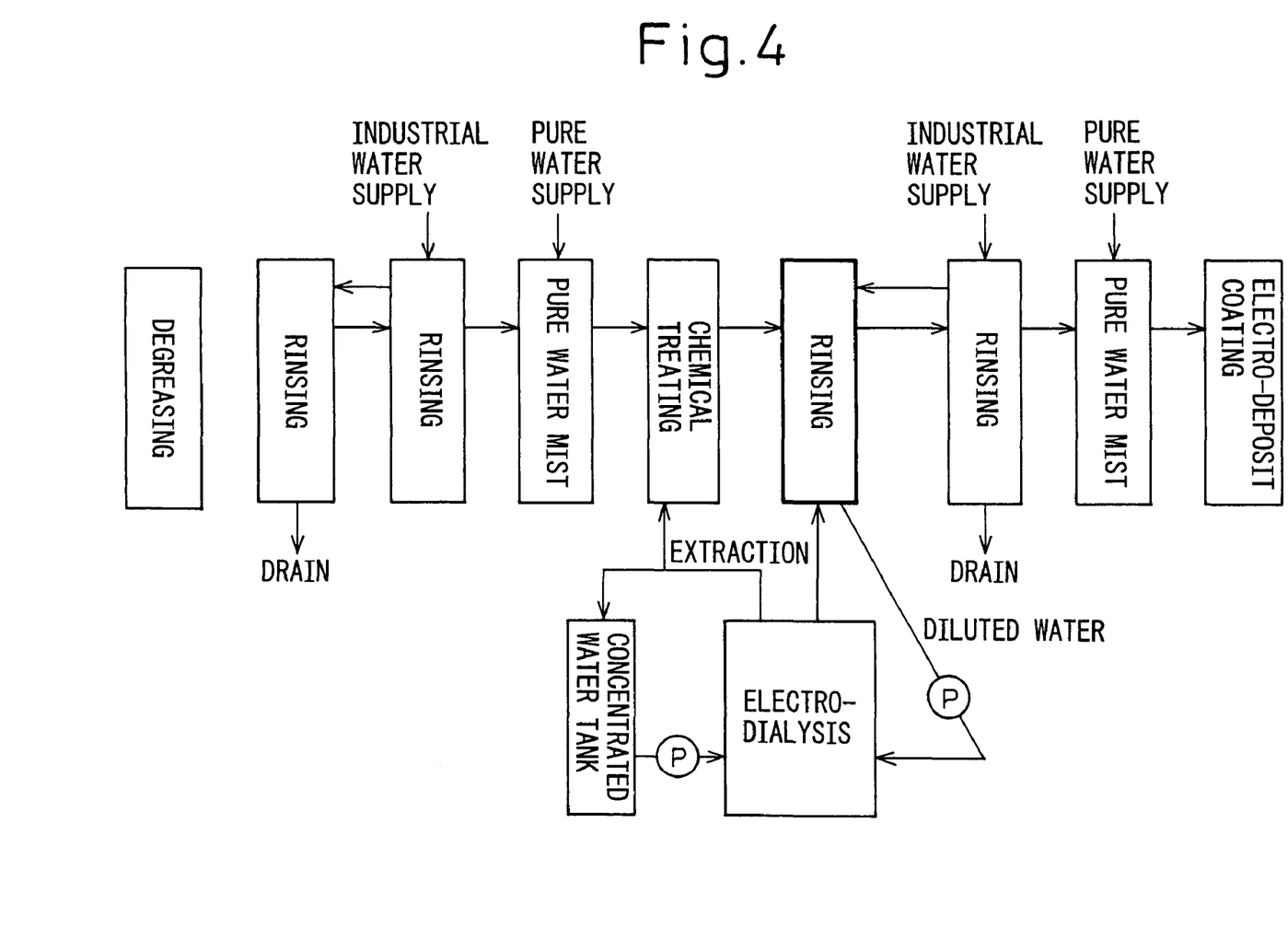
FIG. 4 is a view showing an example of the method of the present invention, for recovering useful components, which is applied to an electro-deposited coating using phosphate chemical treatment.

FIG. 4 shows an example of using electrodialysis to recover useful components in the case where phosphate chemical treatment is employed as under-coating for electro-deposit coating. Component ions of the chemical treatment (phosphoric acid, $NO_3^-$, $Ni_2^+$, $Zn_2^+$, etc.) are introduced into a washing water tank that follows the chemical treatment tank. An electrodialysis system is formed with the washing water tank corresponding to the desalted liquid tank and with the chemical treatment tank corresponding to the concentrated liquid extraction tank of Example 1. (Electrode solution tanks are also formed as in Example 1.) This electrodialysis system is basically the same as in Example 1. Namely, component ions of the chemical treatment are introduced into a washing water tank corresponding to the desalted liquid tank from the chemical treatment tank, and the solution is introduced into a dilution chamber of an electrodialysis equipment. Ions introduced into the dilution chamber are subjected to electrodialysis treatment and are moved to the side of the concentrated liquid tank. As a result, component ions are not accumulated but are diluted in the washing water tank after chemical treatment which corresponds to the dilution tank in electrodialysis. This means that water need not be supplied to the washing water tank after the chemical treatment and that water is not discharged to environment.

On the other hand, component ions accumulated on the side of concentrated liquid tank of the electrodialysis system are concentrated to the concentration of the chemical treatment tank, and are appropriately returned to the chemical treatment tank.

Component ions of chemical treatment that are brought from the washing water tank after chemical treatment to the next washing water tank are of concentration of desalted liquid in Table 1. The concentration is thus lower (to about 1/20) than the value obtained when no electrodialysis is performed (Liquid diluted 20 times in Table 1). Therefore, the amount of component ions of chemical treatment discharged from the electro-deposit coating equipment to environment is also reduced to about 1/20.

The present invention provides, in association with phosphate chemical treatment, a method that is capable of recovering, and reusing in situ, useful components ions of electrolytic phosphate chemical treatment bath without subjecting them to waste water treatment by constructing and utilizing environment which permits electrodialysis to be used. This method further permits environmental contaminants such as nitrogen, phosphorus, etc. to be removed from the discharged waste water.

In the case where phosphate chemical treatment is applied to aluminium material, the treatment bath generally contains fluoride ion. Thus, for treatment of waste water, it has been necessary to provide and operate a waste water treatment equipment for removing fluoride ion, in addition to conventional heavy metal removal equipment and equipment for removal of nitrate and phosphate ions. According to the present invention, the need of fluoride ion removal equipment can be eliminated.

What is claimed is:

1. A method for recovering useful components in an electrolytic phosphate chemical treatment bath, wherein, by contacting a metal material article having electrical conductivity with a phosphate chemical treatment bath and by subjecting the metal material article to be treated to electrolytic treatment in said phosphate chemical treatment bath, a film containing a phosphate compound is formed on the surface of said article to be treated, and then the treated article having phosphate chemical treatment liquid adhered thereto after chemical treatment is contacted with an aqueous solution for dilution and washing, characterized in that:
   (a) a phosphate chemical treatment bath which contains phosphate ions and phosphoric acid, metal ions that form a phosphate crystal to provide a film, metal ions that are reduced from cations in the solution to form a film as metals, and ions that are involved in the reaction of the above-mentioned phosphoric acid and various metal ions to form a film, but which does not substantially contain ions that are not involved in film formation, is used as the phosphate chemical treatment bath, and
   (b) the aqueous solution in the washing water tank with which phosphate chemical treatment liquid adhered to the treated article after chemical treatment is contacted for dilution and washing, is subjected to electrodialysis, and useful components in said aqueous solution is thereby recovered and returned to the chemical treatment bath.

2. A method according to claim 1, wherein the ions that are involved in the reaction of the above-mentioned phosphoric acid and various metal ions to form a film are nitrate ions and/or fluoride ions.

3. A method according to claim 1, wherein the oxidation-reduction potential (ORP) (expressed as potential relative to a standard hydrogen electrode) of the phosphate chemical treatment bath is maintained at 770 mV or higher.

4. A method according to claim 1, wherein the oxidation-reduction potential (ORP) (expressed as potential relative to a standard hydrogen electrode) of the phosphate chemical treatment bath is maintained at 840 mV or higher.

5. A method according to claim 1, wherein aqueous solution of phosphoric acid is used as the electrode solution.

6. A method according to claim 1, wherein the useful components include film components consisting of phosphate ions and phosphoric acid, nitrate ions, and metal ions forming a complex with phosphate ions in the phosphate chemical treatment bath.

7. A method according to claim 6, wherein the useful components further include ions involved in film formation.

8. A method according to claim 7, wherein the ions that are involved in film formation are fluoride ions used in the case where aluminium is used for metal material article to be treated.

9. A method according to claim 1, wherein the useful components are added to the phosphate chemical treatment bath and reused.

10. A method according to claim 1, wherein electrodialysis is performed by introducing the aqueous solution of the washing water tank used for dilution and washing into an electrodialysis tank.

11. A method according to claim 10, wherein the aqueous solution of the washing water tank used for dilution and washing is diluted by a factor of ten or more with water from the phosphate chemical treatment bath after chemical treatment.

12. A method according to claim 10, wherein the electrodialysis tank has multi-cell structure with anion exchange membranes and cation exchange membranes being alternately combined.

13. A method according to claim 10, wherein electrodialysis is performed with transmembrane voltage of the electrodialysis tank not higher than the dissociation voltage of water.

14. A method according to claim 12, wherein the electrodialysis tank is further provided with an electrode solution tank for containing electrode solution and a shut-off tank disposed adjacent to the electrode solution tank for preventing ions subjected to electrodialysis from permeating into the electrode solution tank.

15. A method according to claim 10, wherein concentrated water having ions concentrated by electrodialysis is returned to the phosphate chemical treatment bath.

16. A method according to claim 15, wherein the ion concentration factor is in the range of 10~1000.

17. A method according to claim 10, wherein diluted water having ions diluted by electrodialysis is used for dilution and washing of the phosphate chemical treatment bath after chemical treatment.

18. A method according to claim 17, wherein the ion dilution factor is in the range of 10~1000.

* * * * *